UNITED STATES PATENT OFFICE.

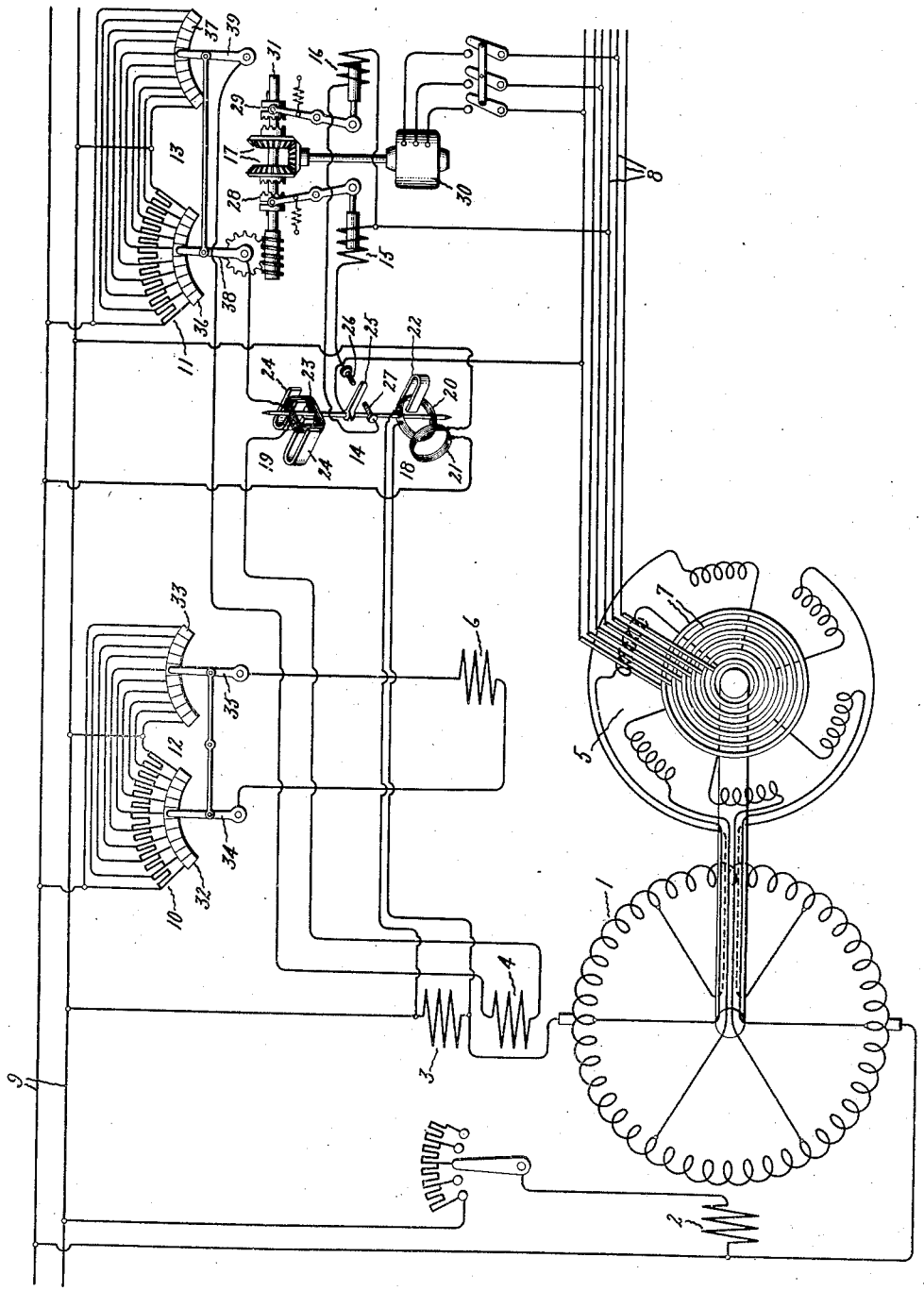

JOHN B. BASSETT, OF SCHENECTADY, NEW YORK, ASSIGNOR TO GENERAL ELECTRIC COMPANY, A CORPORATION OF NEW YORK.

ROTARY CONVERTER.

1,246,702.      Specification of Letters Patent.      Patented Nov. 13, 1917.

Application filed February 18, 1916. Serial No. 79,090.

*To all whom it may concern:*

Be it known that I, JOHN B. BASSETT, a citizen of the United States, residing at Schenectady, county of Schenectady, State of New York, have invented certain new and useful Improvements in Rotary Converters, of which the following is a specification.

My invention relates to rotary converters, and particularly to rotary converters provided with commutating poles and operated in connection with boosters mechanically connected thereto, the field of the boosters being variable for the purpose of varying the ratio between the alternating and direct current voltages. When a booster is mechanically connected to a rotary converter, it imposes a motor load on the converter when boosting and a generator load on the converter when bucking; or in other words, when the booster is boosting the voltage of the converter it must be driven as a generator by the converter, but when operating to buck the converter voltage the booster operates as a motor transmitting mechanical energy to the converter. Under such conditions, the effective armature reaction of the rotary converter varies through wide limits and directly affects the magnetization of the commutating poles. The armature reaction caused by the booster when boosting the converter voltage is in a direction to add to the excitation of the commutating poles of the converter, whereas under the bucking condition the armature reaction caused by the booster is in a direction to subtract from the excitation of the commutating poles of the converter.

My invention has for its object the provision of a novel and simple arrangement by which the strength of the commutating field may be automatically adjusted to the correct value under all conditions of buck and boost. To this end, I provide means responsive to the direct current and direct voltage supplied by the rotary converter for controlling the commutating field of the converter. I preferably provide the converter with two commutating field windings, one of which is connected in series with the direct current brushes and the other of which is connected to a source of voltage which may be varied over the requisite range and also reversed if desired. I control this source of voltage by a device which comprises an element having coils energized by the direct current and direct voltage supplied by the converter, the effect of the voltage coil being opposed by suitable means such as a permanent magnet, and a balancing element having a coil energized by the current flowing in the commutating field winding, which is connected to the above mentioned source of voltage. Such a device will be responsive to a torque proportional to the direct current and voltage of the converter minus a torque proportional to a constant voltage and the direct current of the converter, or, in other words, the device will be responsive to a torque proportional to the watts output of the converter under all conditions of buck or boost minus a torque proportional to the watts output of the converter when the booster is neither bucking nor boosting. The difference between the watts output of the converter under all conditions of buck or boost and the watts output of the converter when the booster is neither bucking or boosting is equal to the booster watts, or the motor or generator load of the booster imposed upon the converter, and consequently the device is responsive to a torque proportional to the motor or generator load imposed by the booster upon the converter. Since the armature reaction of the converter depends upon this load of the booster imposed upon the converter and also upon the current delivered by the converter, the commutating field strength will be varied in accordance with all of these factors.

For a better understanding of my invention reference may be had to the following description taken in connection with the accompanying drawing in which the single figure shows diagrammatically one embodiment of my invention.

In the drawing, I have shown a rotary converter 1 having a main exciting winding 2, a series commutating field winding 3 and an auxiliary commutating field winding 4. The converter 1 is mechanically connected to a booster 5 having a field winding 6. The booster is shown as being of the synchronous type connected through collector rings 7 to alternating current mains 8 and having its alternating current windings connected to the armature windings of the converter. The armature of the converter is shown as being connected to the direct current mains 9 as is the auxiliary commutating field winding 4 and the booster field winding 6. The field of the booster may be varied and reversed by connecting its field winding to a source of voltage which may be varied over a wide range and reversed. This source of voltage comprises a set of resistances 10 connected across the direct current mains 9. The field produced by the auxiliary commutating field winding may be varied and reversed by connecting it to a source of voltage which may be varied over a wide range and reversed. This source of voltage also comprises a set of resistances 11 connected across the direct current mains 9. The sets of resistances 10 and 11 are preferably the resistance elements of double dial rheostats 12 and 13.

The movement of the double dial rheostat 13 is controlled by a contact making device 14 through solenoids 15 and 16 and gearing 17. The solenoids 15 and 16 constitute the energizing coils of electro-magnets which may be of any desired form. The device 14 comprises an element 18 and a balancing element 19. The element 18 has a coil 20 energized by the direct current supplied by the rotary converter, a coil 21 energized by the direct voltage supplied by the rotary converter, that is, the voltage of the direct current end of the converter, and a permanent magnet 22 proportional to the mean direct voltage of the converter which opposes the effect of the coil energized by the direct voltage. The coil 20 is shown as being connected across the series commutating field winding 3 and the coil 21 is shown as being connected across the direct current mains 9. The balancing element of the contact making device comprises a coil 23 energized by the current flowing in the circuit of the auxiliary commutating field winding 4, it being connected in the circuit of this winding. This element 19 also has permanent magnets 24. The contact making device has a movable contact 25 and stationary contacts 26 and 27 which control the circuits of the solenoids 15 and 16, which in turn control clutches 28 and 29. The gearing 17 is driven by a motor 30. When one or the other of the clutches 28 or 29 is operated by one or the other of the solenoids the gearing is connected to the shaft 31 so as to drive it in one direction or the other and consequently the double dial rheostat 13, to which the shaft 31 is mechanically connected, the motor 30 being in continuous operation and always rotating in the same direction.

The set of resistances 10 of the double dial rheostat 12 is connected to two rows of contacts 32 and 33, the terminals of the booster field 6 are connected to arms 34 and 35 of this rheostat, these arms being rigidly connected together. When these arms engage the extreme left hand contacts, the full voltage of the mains is applied to this field winding in one direction. By moving the arms to adjacent contacts, a voltage less than that of the mains is applied to this field winding, a further movement of the arms toward the right still further decreases the voltage applied to the winding 6. When the arms engage the middle contacts, no voltage is applied to the winding 6. A further movement of the arms toward the right applies a voltage less than the line voltage to the winding 6 which is in the opposite direction to that which was applied when the arms engaged contacts to the left of the middle. As the arms approach the extreme right hand contacts, the voltage applied increases until they engage these latter contacts, when full voltage is applied to the winding 6 in the opposite direction to that applied when the arms engaged the extreme left hand contacts.

Similarly, the set of resistances 11 of the double dial rheostat 13 is connected to two rows of contacts 36 and 37, and the terminals of the auxiliary commutating field winding 4 are connected to the arms 38 and 39, which are rigidly connected together and engage the rows of contacts 36 and 37. The voltage applied to the field winding 4 is varied and reversed as the arms 38 and 39 move from left to right as explained above in connection with the booster field winding 6.

The operation of my arrangement is as follows:—

Assume now that the arms 34, 35, 38 and 39 are in their mid positions, in which case no voltage is applied to either windings 6 or 4, and consequently no current flows in them. The booster 5 then neither bucks nor boosts, and consequently the direct voltage supplied by the converter to the mains 9 is equal to the mean voltage of the converter. The effect of the coil 21 of the element 18 is therefore equal but opposite to the effect produced by the permanent magnet 22. In other words, the torque produced by the coils 20 and 21 is equal and opposite to the torque produced by the coil 20 and the permanent magnet 22, and therefore no torque is produced in the element 18. Similarly no current flows in the coil 23 of the balancing element and consequently the movable contact 25 stays in its mid position and does not close the circuit of either of the solenoids 15 or 16. If now it is desired to raise the voltage delivered by the rotary converter, the arms 34 and 35 are moved in such a direction that a voltage is applied to the field winding 6 of the booster so that it operates as a generator. The voltage of the booster is now added to the alternating voltage of the mains 8 and consequently raises the voltage supplied by the converter. Assuming now that the converter is delivering load, the effect of the coil 21 of the element 18 of the contact making device is now greater than the effect produced by the magnet 22, or in other words, the torque produced by the coils 20 and 21 is greater than the torque produced by the coil 20 and the magnet 22, causing the contact 25 to move so as to close the circuit of one or the other of the solenoids 15 or 16 through the contact 26 or 27, depending upon the electrical connections, thus throwing in one or the other of the clutches 28 or 29, whereupon the arms 38 and 39 begin to move as the gearing 17 is in constant motion. A voltage is thereby applied to the auxiliary commutating field winding 4 so that the field produced by it opposes the field produced by the series commutating field winding 3. The arms 38 and 39 continue to move until (considering a constant load upon the converter) the current supplied the winding 4 is sufficient to produce a torque in the coil 23 of the balancing element 19 equal to the torque in the element 18 of the contact making device. This will cause the contact 25 to move and open the circuit of the solenoid 15 or 16 and the arms 35 and 36 will come to rest. If the load on the converter increases, the torque of the element 18 of the contact making device will again predominate and the solenoid which was previously energized will again be energized to increase the current in the commutating field winding 4, the arms 38 and 39 moving until a balance is again reached. If the load on the converter decreases, the torque of the balancing element 19 will predominate and the solenoid which was not previously energized will now be energized and will cause the arms 38 and 39 to move to decrease the voltage applied to the winding 4 until a balance is again reached. With the windings arranged as shown in the drawing, the arms 38 and 39 are moved to the right of their mid position for the boost condition.

If it is desired to lower the voltage of the converter, the arms 34 and 35 are moved in the opposite direction from the mid position, in which case the booster operates as a motor and generates a voltage in the opposite direction to that generated when acting as a generator, that is, it acts to reduce the voltage of the alternating current mains 8 and thus lower the voltage supplied by the converter. Assuming now that the converter is delivering load, the torque produced by the coils 20 and 21 is less than the torque produced by the coil 20 and the magnet 22, causing the contact 25 to move so as to close the circuit of the solenoid controlling the clutch which moves the arms 38 and 39 so as to apply a voltage to the auxiliary commutating field winding 4 whereby the field produced by it assists the field produced by the series commutating field winding. An increase of load on the converter increases the strength of the auxiliary commutating field winding and a decrease in load decreases the strength of this field in the same way as described above in connection with the operation of the booster 5 as a generator.

By providing the double dial rheostat 12 with a great number of resistance elements, the amount of boost or buck may be regulated by very small steps, and by providing the double dial rheostat 13 with a great number of resistance elements and properly designing the gearing 17 so that the shaft 31 rotates at comparatively low speed, the strength of the commutating field may be accurately adjusted to take care of all variation in armature reaction of the converter due to the variations in motor or generator load of the booster and to the variations in load on the converter.

The booster 5 and rotary converter 1 are shown as six phase machines and the motor 30 as a three phase machine, but it is evident that they may be of any number of phases. Although I have shown the element 18 of the contact making device provided with a permanent magnet 22, it is evident that this magnet need not be a permanent magnet but may be an electromagnet supplied from a constant source of excitation. If desired this element of the contact making device may comprise two current coils, one being associated with a coil energized by the direct voltage supplied by the rotary converter and the other associated with a magnet which produces a constant field. Under certain conditions the series commutating field winding may be dispensed with. The booster 5 is shown as being of the synchronous type but, obviously, it might be of any well known type. I aim in the appended claims to cover all such modifications as well as any other modifications which do not depart from the spirit and scope of my invention.

What I claim as new and desire to secure by Letters Patent of the United States, is:

1. In combination, a rotary converter having a commutating field winding, a booster mechanically connected thereto, means for varying the field of said booster, and means responsive to the direct current and the direct voltage supplied by said rotary converter for controlling said commutating field.

2. In combination, a rotary converter having a series commutating field winding and an auxiliary commutating field winding, a booster mechanically connected to said converter, means for varying the field of said booster, and means responsive to the direct current and the direct voltage supplied by said rotary converter for controlling the current in said auxiliary commutating field winding.

3. In combination, a rotary converter having a commutating field winding, a booster mechanically connected thereto, means for varying the field of said booster, means for varying the field produced by said commutating field winding, and means for controlling said last mentioned means comprising a contact making device having coils energized by the direct current and the direct voltage supplied by said rotary converter.

4. In combination, a rotary converter having a commutating field winding, a booster mechanically connected thereto, means for varying the field of said booster, means for varying the field produced by said commutating field winding, and means for controlling said last mentioned means comprising an element having coils energized by the direct current and the direct voltage supplied by the rotary converter and means opposing the effect of the coil energized by said direct voltage, and a balancing element having a coil energized by the current flowing through said commutating field winding.

5. In combination, a rotary converter having a commutating field winding, a booster mechanically connected thereto, means for varying and reversing the field of said booster, means for varying and reversing the field produced by said commutating field winding, and means for controlling said last mentioned means comprising an element having coils energized by the direct current and the direct voltage supplied by said rotary converter and means proportional to the mean direct voltage of the rotary converter opposing the effect of the coil energized by the direct voltage and a balancing element having a coil energized by the current flowing through said commutating field winding.

6. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising a contact making device, said contact making device having coils energized by the direct current and the direct voltage supplied by said rotary converter.

7. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising an element having coils energized by the direct current and the direct voltage of the rotary and means proportional to the mean direct voltage of the rotary converter opposing the effect of the coil energized by the direct voltage and a balancing element having a coil energized by the current flowing through said commutating winding.

8. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat, and a contact making device for closing the circuits of said solenoids, said contact making device having coils energized by the direct current and the direct voltage supplied by said rotary converter.

9. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat, and a contact making device for closing the circuits of said solenoids, said contact making device comprising an element having coils energized by the direct current and the direct voltage of the rotary and means proportional to the mean direct voltage of the rotary converter opposing the effect of the coil energized by the direct voltage, and a balancing element having a coil energized by the current flowing through said commutating field winding.

10. In combination, a rotary converter having a series commutating field winding and an auxiliary commutating field winding, a booster mechanically connected thereto, means for varying the field of said booster, means for varying the field produced by said auxiliary commutating field winding, and means for controlling said last mentioned means comprising a contact making device having coils energized by the direct current and the direct voltage supplied by said rotary converter.

11. In combination, a rotary converter having a series commutating field winding and an auxiliary commutating field winding, a booster mechanically connected thereto, means for varying the field of said booster, means for varying the field produced by said auxiliary commutating field winding, and means for controlling said last mentioned means comprising an element having coils energized by the direct current and the direct voltage of the rotary converter and means opposing the effect of the coil energized by the direct voltage, and a balancing element having a coil energized by the current flowing through said auxiliary commutating field winding.

12. In combination, a rotary converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising an element having coils energized by the direct current and the direct voltage supplied by said rotary converter and means proportional to the mean direct voltage of the rotary converter opposing the effect of the coil energized by the direct voltage, and a balancing element having a coil energized by the current flowing through said auxiliary commutating field winding.

13. In combination, direct current means, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for controlling said double dial rheostat comprising a contact making device having coils energized by the direct current and the direct voltage supplied by said rotary converter.

14. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for controlling said double dial rheostat comprising an element having coils energized by the direct current and the direct voltage supplied by said rotary converter and means proportional to the mean direct voltage of the rotary converter opposing the effect of the coil energized by the direct voltage, and a balancing element having a coil energized by the current flowing through said auxiliary commutating field winding.

15. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, solenoids controlling the movement of the arms of the double dial rheostat, and a contact making device closing the circuits of said solenoids, said contact making device having coils energized by the direct current and the direct voltage supplied by said rotary converter.

16. In combination, direct current means, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, solenoids controlling the movement of the arms of the double dial rheostat, and a contact making device closing the circuits of said solenoids, said contact making device comprising an element having coils energized by the direct current and the direct voltage supplied by said rotary converter and means proportional to the mean direct voltage of the rotary converter opposing the effect of the coil energized by the direct voltage, and a balancing element having a coil energized by the current flowing through said auxiliary commutating field winding.

In witness whereof, I have hereunto set my hand this 17th day of February 1916.

JOHN B. BASSETT.

It is hereby certified that in Letters Patent No. 1,246,702, granted November 13, 1917, upon the application of John B. Bassett, of Schenectady, New York, for an improvement in "Rotary Converters," an error appears in the printed specification requiring correction as follows: Page 5, lines 36 and 91, claims 13 and 16, for the word "means" read *mains;* and that the said Letters Patent should be read with this correction therein that the same may conform to the record of the case in the Patent Office.

Signed and sealed this 12th day of February, A. D., 1918.

[SEAL.]

J. T. NEWTON,
*Commissioner of Patents.*

Cl. 171—123.